(12) United States Patent
Yamamoto et al.

(10) Patent No.: US 7,346,261 B2
(45) Date of Patent: Mar. 18, 2008

(54) IMAGE DISPLAY APPARATUS

(75) Inventors: Akira Yamamoto, Yokohama (JP); Shuichi Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 11/321,092

(22) Filed: Dec. 28, 2005

(65) Prior Publication Data
US 2006/0139760 A1    Jun. 29, 2006

(30) Foreign Application Priority Data
Dec. 28, 2004    (JP)    ............... 2004-379937

(51) Int. Cl.
*G02B 6/10* (2006.01)
*G01B 26/08* (2006.01)
*G01B 9/10* (2006.01)
*G02B 6/00* (2006.01)
*G02B 27/14* (2006.01)
*G02B 17/10* (2006.01)
*G01D 5/36* (2006.01)

(52) U.S. Cl. ............ 385/146; 385/132; 385/147; 359/205; 359/633; 359/732; 250/227.32; 250/235

(58) Field of Classification Search ............ 385/133, 385/146, 147, 132; 250/235; 359/205, 627, 359/630–633, 727–729, 731, 732
See application file for complete search history.

(56) References Cited

U.S. PATENT DOCUMENTS

| 5,467,104 A | 11/1995 | Furness, III et al. |
| 5,606,447 A | 2/1997 | Asada et al. |
| 5,701,132 A | 12/1997 | Kollin et al. |
| 5,701,202 A * | 12/1997 | Takahashi ............ 359/630 |
| 5,767,544 A | 6/1998 | Kuroda et al. |
| 5,940,218 A * | 8/1999 | Takahashi ............ 359/630 |
| 6,124,989 A * | 9/2000 | Oode et al. ............ 359/729 |
| 6,166,858 A * | 12/2000 | Togino et al. ............ 359/633 |
| 6,185,046 B1 * | 2/2001 | Togino ............ 359/631 |
| 6,201,646 B1 * | 3/2001 | Togino et al. ............ 359/629 |
| 6,310,736 B1 * | 10/2001 | Togino ............ 359/834 |
| 6,333,820 B1 | 12/2001 | Hayakawa et al. |
| 6,510,006 B1 * | 1/2003 | Togino ............ 359/631 |

(Continued)

FOREIGN PATENT DOCUMENTS

JP    07-175005    7/1995

(Continued)

*Primary Examiner*—Michelle R. Connelly-Cushwa
*Assistant Examiner*—Rhonda S. Peace
(74) *Attorney, Agent, or Firm*—Morgan & Finnegan, L.L.P.

(57) ABSTRACT

There disclosed is an image display apparatus having a light source, a scanning member for deflecting a light from the light source to scan a predetermined surface with the light to form a two-dimensional image thereon, a first optical system for guiding a light deflected by the scanning member to the predetermined surface and a second optical system for guiding a light from the two-dimensional image formed onto the predetermined surface to an observer. There exists, in optical paths of the first optical system and the second optical system, a common optical element with a plurality of optical surfaces including refractive surfaces and reflective surfaces formed on a same medium and the first optical system and the second optical system share a part of optical surfaces of that optical element.

8 Claims, 6 Drawing Sheets

U.S. PATENT DOCUMENTS

| | | |
|---|---|---|
| 6,728,044 B2 * | 4/2004 | Akiyama et al. ............ 359/676 |
| 6,788,343 B1 * | 9/2004 | Togino ........................ 348/341 |
| 2002/0159158 A1 * | 10/2002 | Nagata ........................ 359/630 |
| 2003/0107785 A1 * | 6/2003 | Takeyama et al. ............. 359/15 |
| 2004/0061916 A1 * | 4/2004 | Kuba ........................... 359/205 |
| 2004/0232322 A1 * | 11/2004 | Kobayashi et al. .......... 250/235 |

FOREIGN PATENT DOCUMENTS

| | | |
|---|---|---|
| JP | 08-334723 | 12/1996 |
| JP | 11-125791 | 5/1999 |
| JP | 2001-004955 | 1/2001 |
| JP | 2001-194617 | 7/2001 |

* cited by examiner

IMAGE DISPLAY APPARATUS

BACKGROUND OF THE INVENTION

1. Field of the Invention

The present invention relates to an image display apparatus suitable for a head mount type display and an electronic viewfinder system, etc.

2. Related Background Art

Currently, as image display in an electronic viewfinder system such as head mount type display apparatus or a digital camera etc., a two-dimensional display element called as a flat panel display such as a transmission type liquid crystal, reflection type liquid crystal or an organic EL element etc. are used. And combining these two-dimensional display elements with an eyepiece optical system (ocular optical system), the display image is observed as a virtual image.

In recent years, further highly fine image display is required for such an image display apparatus. Therefore, production of a great number of pixels on a flat panel display is required.

In general, an increase in pixel counts leads to increase in pixel defect. In addition, the pixel size gets small relatively with size of the flat panel to make production thereof difficult.

In addition, such an image display apparatus of causing an observer to recognize a two-dimensional image visually with a scanning member without using any two-dimensional image display element is known as well (U.S. Pat. No. 5,467,104).

U.S. Pat. No. 5,467,104 describes technology of scanning a retina in the horizontal direction and the perpendicular direction with the respective colors of Red, Green and Blue light to directly form an image onto the retina through an optical system.

In addition, for a scanning type image display apparatus, a method of enlarging a small exit pupil diameter is proposed (U.S. Pat. Nos. 5,701,132 and 5,767,544).

The other scanning type image display apparatuses are proposed as well (Japanese Patent Application Laid-Open No. 2001-004955, Japanese Patent Application Laid-Open No. 2001-194617 and Japanese Patent Application Laid-Open No. H11-125791 (corresponding to U.S. Pat. No. 6,333,820).

On the other hand, with progress in semiconductor processing, such a technology of producing a small and light in weight but rapid scanning member with a Micro Electro Mechanical SYSTEM (MEWS) has been proposed (Japanese Patent Application Laid-Open H07-175005 (corresponding to U.S. Pat. No. 5,606,447) and Japanese Patent Application Laid-Open No. H08-334723).

SUMMARY OF THE INVENTION

In consideration of the above described prior arts, an exemplifying object of the present invention is to provide a compact image display apparatus.

The exemplifying image display apparatus of the present invention has a light source, a scanning member for deflecting the light from the light source to form a two-dimensional image onto a predetermined surface, a first optical system for guiding the light deflected by the scanning member onto the predetermined surface and a second optical system for guiding the light from the two-dimensional image formed onto the predetermined surface to an observer. In optical paths of the first optical system and the second optical system, there exist common optical element with a plurality of optical surfaces including a refractive surface and a reflective surface formed onto the same medium, and the first optical system and the second optical system have a part of that optical surfaces in common. And the light deflected by the scanning member is guided to the predetermined surface through the reflective surface of the optical element.

DESCRIPTION OF THE PREFERRED EMBODIMENTS

As follows, with the drawings, embodiments of an image display apparatus of the present invention will be described.

Embodiment 1

Figure 1:
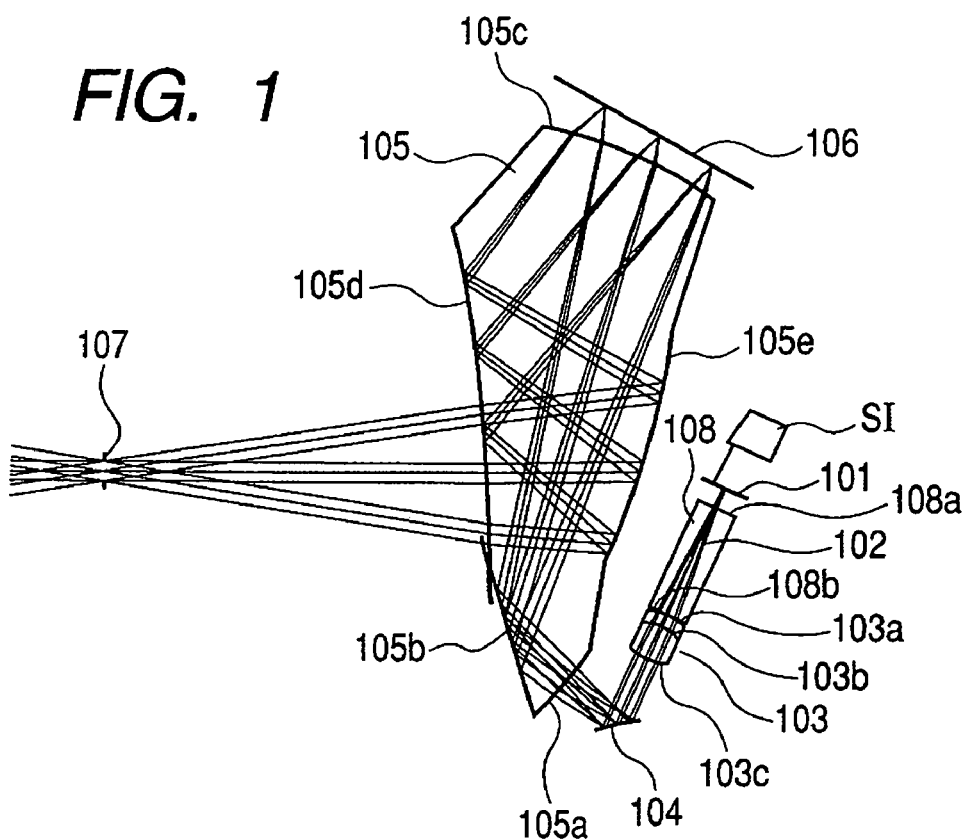
FIG. 1 is a perpendicular sectional diagram of an optical system for an image display apparatus in Embodiment 1.

FIG. 1 is a perpendicular sectional diagram of an optical system for an image display apparatus in Embodiment 1.

In FIG. 1, reference numeral 101 denotes a light source. Reference numeral 108 denotes a color combining member configured, for example, by a dichroic prism. In FIG. 1, the color combining member 108 is expressed as a block where an optical path is expanded. Reference numeral 103 denotes a collecting optical system. Reference numeral 104 denotes a scanning member. Reference numeral 105 denotes a prism member. Reference numeral 106 denotes a scanned surface, being a reflective surface having diffusion action. Reference numeral 107 denotes the position of an exit pupil for the present image display apparatus where an eye of an observer shall be disposed. Reference characters SI denote a light source drive circuit.

The light source 101 is driven by a light source drive circuit SI based on an input signal corresponding to a displayed image to emit a modulated light beam of a plurality of color lights. The light beam 102 having emitted from the light source 101 is to become a focused light beam by a collecting optical system 103 through a color combining member 108 and enters the scanning member 104.

Reference numerals 108a and 108b denote an entrance surface and an exit surface of the color combining member 108.

The collecting optical system 103 consists of a cemented lens with a negative lens and a positive lens. Reference numerals 103a, 103b and 103c denote respective surfaces of the cemented lens.

The light beam 102 undergoes deflecting two-dimensionally by the scanning member 104 and enters the prism member (optical element) 105. The light beam 102 having entered the prism member 105 passes the entrance surface (first optical surface) 105*a*, the reflective surface (second optical surface) 105*b* and the transmission surface (third optical surface) 105*c* in order from the side where the light beam from the light source 101 enters to enter the scanned surface 106. A two-dimensional image is formed with light beam scanning with the scanning member 104 onto the scanned surface 106. In addition, the scanned surface 106 is to become a flat turn-back reflecting surface (diffusion surface).

The light beam 102 forms a spot on the scanning surface 106 or in the vicinity thereof to be reflected on the scanned surface 106 and enters the prism member 105 again through the surface of the transmission surface 105*c*.

Having entered the prism member 105 again, the light beam 102 undergoes total reflection with the optical surface (fourth optical surface) 105*d* and is reflected further with the reflective surface (fifth optical surface) 105*e* and thereafter transmits the optical surface (sixth optical surface) 105*d* to enter the exit pupil 107 which is conjugate with the scanning member 104.

The observer locates his/her eyes in the vicinity of the exit pupil 107 and thereby can observe an image formed onto the scanned surface 106.

As described above, the image display apparatus of the present embodiment scans the scanned surface 106 with a light beam from the light source 101 deflected by the scanning member 104 through a scanning optical system (first optical system) to form an image onto the scanned surface 106 and to guide image information on the scanned surface 106 to the observer by an ocular optical system (second optical system).

Here, surfaces being present in the optical path from the scanning member 104 and to the scanning surface 106 with the scanned surface 106 being as a center are three surfaces, that is, the optical surfaces 105*a*, 105*b* and 105*c*. Those optical surfaces 105*a* to 105*c* have action as a scanning optical system to form an image of the light beam 102 deflected by the scanning member 104 into image forming onto the scanned surface 106. The optical surfaces 105*c* to 105*e* being present in the optical path from the scanned surface 106 to the exit pupil 107 have action as an ocular optical system for the observer to magnify and observe the image having been formed onto the scanned surface 106.

The action of those two optical systems of the scanning optical system and the ocular optical system are realized by one prism member 105. And the scanning optical system and the ocular optical system have, in common, one optical surface 105*c* among a plurality of optical surfaces formed in one prism member 105. As follows, in Embodiment 1, a description involving the scanning optical system is to refer to the optical system with the optical surfaces 105*a* to 105*c* while a description involving the ocular optical system is to refer to the optical system with the optical surfaces 105*c* to 105*e*.

In order to focus an image of the light source as an inverted image onto the scanned surface 106 without forming an intermediate image thereof on the optical path of the scanning optical system, powers of the respective surfaces of the optical surfaces 105*a* to 105*c* have been weakened and the curvatures thereof have been made small. In addition, the reflective surface closest to the scanning surface 106 in the optical paths in the scanning optical system and the closest surface to the exit pupil among the surfaces configuring the prism member 105 are separated into two optical surfaces 105*b* and 105*d* so as to retain optical performance of the scanning optical system and the ocular optical system well. Further, the image formed on the scanned surface 106 is guided to the observer through the ocular optical system without forming an image thereof again. By the above described configuration, the optical path length is designed shortened, thereby realizing a compact image display apparatus.

Moreover, using the optical surface 105*c* in common for the scanning optical system and theocular optical system, compactness of the whole optical system has been intended.

Here, one or more of the optical surfaces 105*a* to 105*e* of the prism optical system 105 is/are configured by rotationally asymmetric surface/surfaces lacking a rotational symmetrical axis. In addition, the reflective surface 105*b* and the total reflective surface 105*d* are configured by rotationally asymmetric surface surfaces described with an equation having different coefficients.

Employing a configuration in which an image of the light source 101 is formed only once on the optical path between the scanning member 104 and the exit pupil 107 being in a conjugate relation, the optical path from the scanning member 104 to the scanned surface 106 can be shortened to realize compactness of the optical system.

In addition, configuring the scanning optical system and the ocular optical system with one prism member 105 having a surface to be utilized in common, configuration of the optical system has been simplified. Here, in the present embodiment, the optical system is configured by one prism, but should there be even one prism member having a surface to be utilized in common in the two optical systems of the scanning optical system and theocular optical system, a prism member and a lens member etc. can be present in addition thereto.

In addition, in the present embodiment, the location of the light source 101 is moved on the center axis of the exit light beam 102 and the scanned surface 106 (turn-back reflecting surface) is moved in conjunction therewith in the direction along the incident light beam so as to undergo diopter adjustment. At that time, the location of the image observed by the observer is occasionally shifted inward on the sheet surface in FIG. 1 due to the movement of the scanned surface 106. In that case, the scanning member 104 is rotated about an axis perpendicular to the sheet surface and with the deflection point of the scanning member 104 being the center so as to enable compensation on the shifts that occur.

In addition, if the scanned surface 106 is moved in the direction of the center axis of the light beam passing the center of the scanning angle range of the scanning member 104, the effective area necessary for the scanned surface 106 will become the smallest. Therefore, movement in this direction is preferable.

In the present embodiment, the lights from the light source 101 independently emitting red, green and blue light are synthesized by a color combining member 108 and the light beam derived by light sources of respective colors undergoes modulation in accordance with the video signal and thereby a color image is provided to the observer. In the case where color image display is not necessary, a single color light source may be used.

Figure 2:
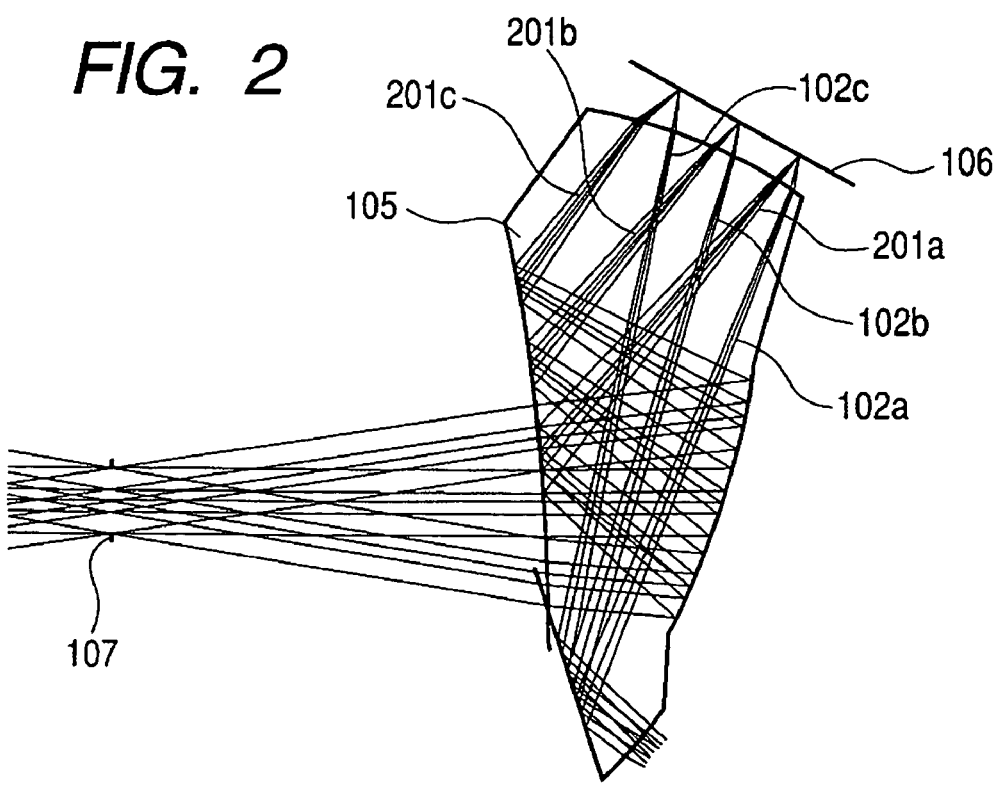
FIG. 2 is an explanatory diagram on diffusing action in a turn-back reflecting surface.

FIG. 2 is an explanatory diagram of reflective diffusion action that the turn-back reflecting surface (scanned surface 106) has.

The light beams 102*a* to 102*c* deflected by the scanning member 104 and entered the prism member 105 result in image forming onto the scanned surface 106 or in the vicinity thereof and the scanned surface 106 is scanned with the light beams.

There, the light beam 102 entering the scanned surface 106 will become a fine focused light beam, but the reflective and diffusion action belonging to the scanned surface 106 will make the outgoing light beams 201a to 201c into largely expanded light beams. The spread of the light beams 201a to 201c will get large, the light beams reaching the exit pupil 107 will be magnified in diameter thereof.

In addition, the present embodiment employs known two-dimensional scanning means capable of implementing two-dimensional scanning with one device as the scanning member 104 (for example, in Japanese Patent Application Laid-Open No. H08-334723).

Figure 3:
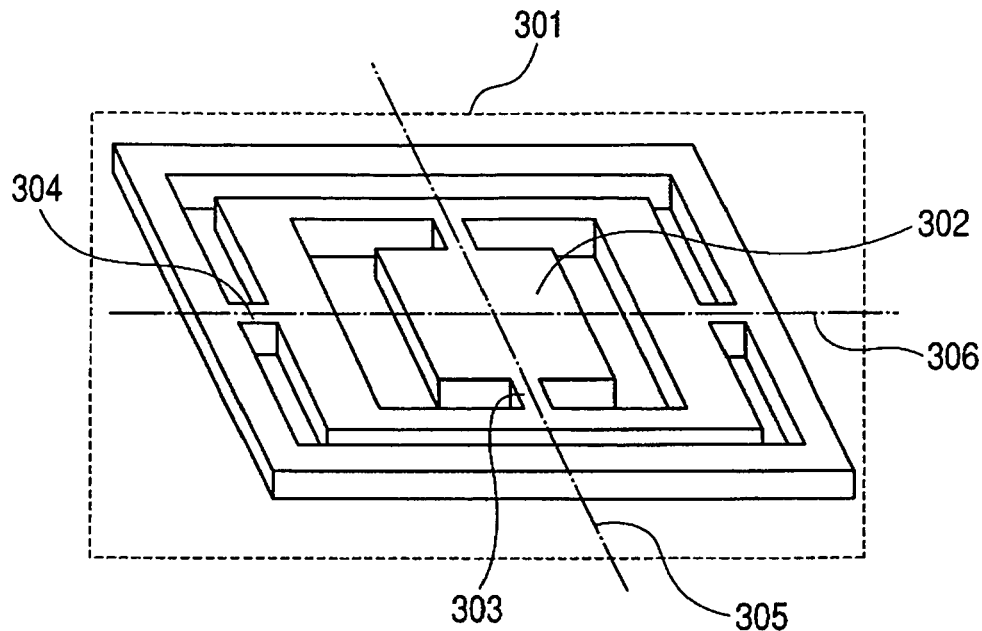
FIG. 3 is an exemplifying diagram of a scanning member.

FIG. 3 exemplifies the scanning member 104.

FIG. 3 shows a deflecting device 301 capable of two-dimensional deflection for scanning configured by an MEMS (Micro Electro Mechanical SYSTEM) made with semiconductor processing technology. The deflecting device 301 is structured to have a micro mirror 302 provided with a deflective surface (reflective surface) being supported by torsion bars 303 and 304. The micro mirror 302 implements resonance reciprocating movement about an axis 305 as a substantial center by twisting of the torsion bar 303 and moreover reciprocating movement about an axis 306 as a substantial center by twisting of the torsion bar 304. That reciprocating movement changes the alignment direction of the deflecting surface 302 two-dimensionally so that the deflecting surface 302 reflects the incident light beam into the micro mirror 302 and implements deflecting two-dimensionally.

As in the present embodiment, the light beam having undergone two-dimensionally deflecting by a compact two-dimensional scanning member is brought into image forming onto the scanned surface 106 by a scanning optical system in utilization of the reflective surface on the prism member 105 so as to shorten the optical length and make it easy to miniaturize an optical system.

Moreover, construction of the scanning optical system and the ocular optical system by an integral prism member 105 decreases the parts count for an optical system and simplifies the configuration of the whole optical system.

Embodiment 2

Figure 4:
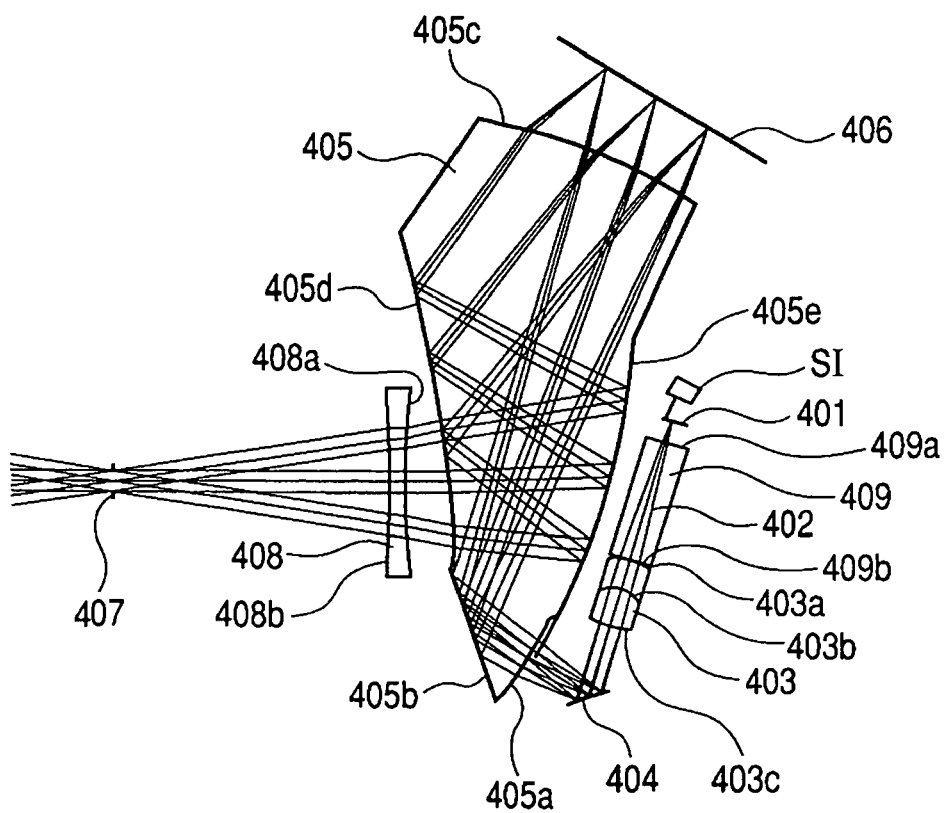
FIG. 4 is a perpendicular sectional diagram of an optical system for an image display apparatus in Embodiment 2.

FIG. 4 is a perpendicular sectional diagram of an optical system in Embodiment 2 for an image display apparatus of the present invention.

In FIG. 4, reference numeral 401 denotes a light source. Reference numeral 409 denotes a color combining member configured, for example, by a dichroic prism. Reference numeral 403 denotes a focusing optical system. Reference numeral 404 denotes a scanning member. Reference numeral 405 denotes a prism member. Reference numeral 406 denotes a scanned surface, being a reflective surface with the diffusion action. Reference numeral 408 denotes a lens member configured by a rotational symmetrical surface. Reference numeral 407 denotes the position of an exit pupil for the present image display apparatus where an eye of an observer shall be disposed. Reference character SI denotes a light source drive circuit.

The light source 401 emits modulated light beam by a light source drive circuit SI based on an input signal corresponding to a displayed image.

The light beam 402 emitted from the light source 401 is to become a convergent light beam by a collecting optical system 403 through a color combining member 409 and enters the scanning member 404.

Reference numerals 409a and 409b denote an entrance surface and an exit surface configuring the color combining member 409. Reference numerals 403a, 403b and 403c denote respective surfaces of a cemented lens with a negative lens and a positive lens configuring the collecting optical system 403. Reference numerals 408a and 408b denote respective surfaces configuring a lens member.

The light beam 402 undergoes deflecting two-dimensionally by the scanning member 404 and enters the prism member 405.

The light beam 402 having entered the prism member 105 passes the entrance surface (first optical surface) 405a, the reflective surface (second optical surface) 405b and the transmission surface (third optical surface) 405c in order from the side where the light beam from the light source 401 enters to enter the scanned surface 406. At that time, a two-dimensional image is formed on the scanned surface 406 by scanning with the light beam by the scanning member 404.

The scanned surface 406 is to become a flat turn-back reflecting surface. The light beam 402 forms an image in a spot on the scanned surface 406 or in the vicinity thereof to be reflected with the scanned surface 406 and enters the prism member 405 again through the surface of the transmission surface 405c. Having entered the prism member 405 again, the light beam 402 undergoes total reflection by the optical surface (fourth optical surface) 405d and is reflected further by the reflective surface (fifth optical surface) 405e and thereafter transmits the optical surface (sixth optical surface) 405d to leave the prism member 405. The light beam having exited the prism member 405 transmits the lens member 408 to enter the exit pupil 407 which is conjugate with the scanning member 404.

The observer locates his/her eyes in the vicinity of the exit pupil 407 and thereby can observe an image formed onto the scanned surface 406.

Here, surfaces being present in the optical path from the scanning member 404 and to the scanned surface 406 with the scanned surface 406 being as a center are three surfaces, that is, the optical surfaces 405a, 405b and 405c. Those optical surfaces 405a to 405c have action as a scanning optical system to form an image of the light beam 402 deflected by the scanning member 404 on the scanned surface 406. The optical surfaces 405c to 405e present in the optical path from the scanned surface 406 to the exit pupil 407 and the lens member 408 have action as an ocular optical system for the observer to observe the image having been formed onto the scanned surface 406.

The action of those two optical systems of the scanning optical system and the ocular optical system are realized with two optical members of one prism member 405 and one lens member 408. And the scanning optical system and the ocular optical system have, in common, one optical surface 405c among a plurality of optical surfaces formed in the prism member 405. In the following, in Embodiment 2, a description involving the scanning optical system is to refer to the optical system with the optical surfaces 405a to 405c while a description involving the ocular optical system is to refer to the optical system with the optical surfaces 405c to 405e and the lens member 408.

In order to focus the light source image as an inverted image on the scanned surface 406 without forming an intermediate image thereof on the optical path of the scanning optical system, powers for the respective surfaces of the optical surfaces 405a to 405c have been weakened and the curvatures thereof have been made small.

In addition, the reflective surface closest to the scanned surface 406 in the optical paths in the scanning optical system and the surface closest to the exit pupil among the surfaces configuring the prism member 405 are separated into two optical surfaces 405b and 405d so as to retain optical performance of the scanning optical system and the ocular optical system well.

Moreover, using the optical surface 405c in common for the scanning optical system and the ocular optical system, compactness of the whole optical system has been intended.

Here, one or more of the optical surfaces 405a to 405e of the prism optical system 405 is/are configured by rotationally asymmetric surface/surfaces having no rotational symmetrical axis. In addition, the reflective surface 405b and the total reflective surface 405d are configured by rotational asymmetrical reflecting surfaces described by respective equations with coefficients different from each other.

Hereinafter, the configuration of the scanned surface 409 having reflective diffusion action and the scanning member 404 and the how of color image display etc. are likewise Embodiment 1, description thereof will be omitted.

Employing a configuration of forming an image of the light source 401 only once on the optical path between the scanning member 404 and the exit pupil 407 being in a conjugate relation, the optical path from the scanning member 404 to the scanned surface 406 can be shortened to realize compactness of the optical system.

Moreover, in the present embodiment, the diopter adjusting function is realized by moving the lens member 408 in the direction of the center axis of the lens. Of course likewise Embodiment 1, it may be also realized by moving the turn-back reflecting surface 406 and the scanning member 404 in collaboration with each other. In addition, if the diopter adjustment by moving the lens member 408, the lens member 408 is not limited to a lens configured by a rotational symmetrical surface but such a lens that has an anamorphic aspheric surface or a rotationally asymmetric surface may be used.

In addition, in case of using an optical plastic for the prism member 405, protection thereof will become necessary since a plastic member is soft and vulnerable. With the lens member 408 made of glass being disposed between the prism member 405 and the observer, the lens member 408 can be assigned to play the role of a member protecting the prism member 405.

As in the present embodiment, the light beam having undergone two-dimensional deflecting by the scanning member 404 is brought into image forming onto the scanned surface 406 in utilization of the reflective surface on the prism member 405 using a scan optical system so as to shorten the optical length and make it easy to miniaturize an optical system.

Moreover, configuring the scanning optical system and the ocular optical system by one prism member 405 and one lens member 408, the number of members of the optical system can be decreased thereby simplifying the configuration of the whole optical system.

In addition, the lens member 408 is disposed between the observer and the prism member 405 and thereby is assigned to execute diopter adjusting function and play the role of the member protecting the prism, etc.

Embodiment 3

Figure 5:
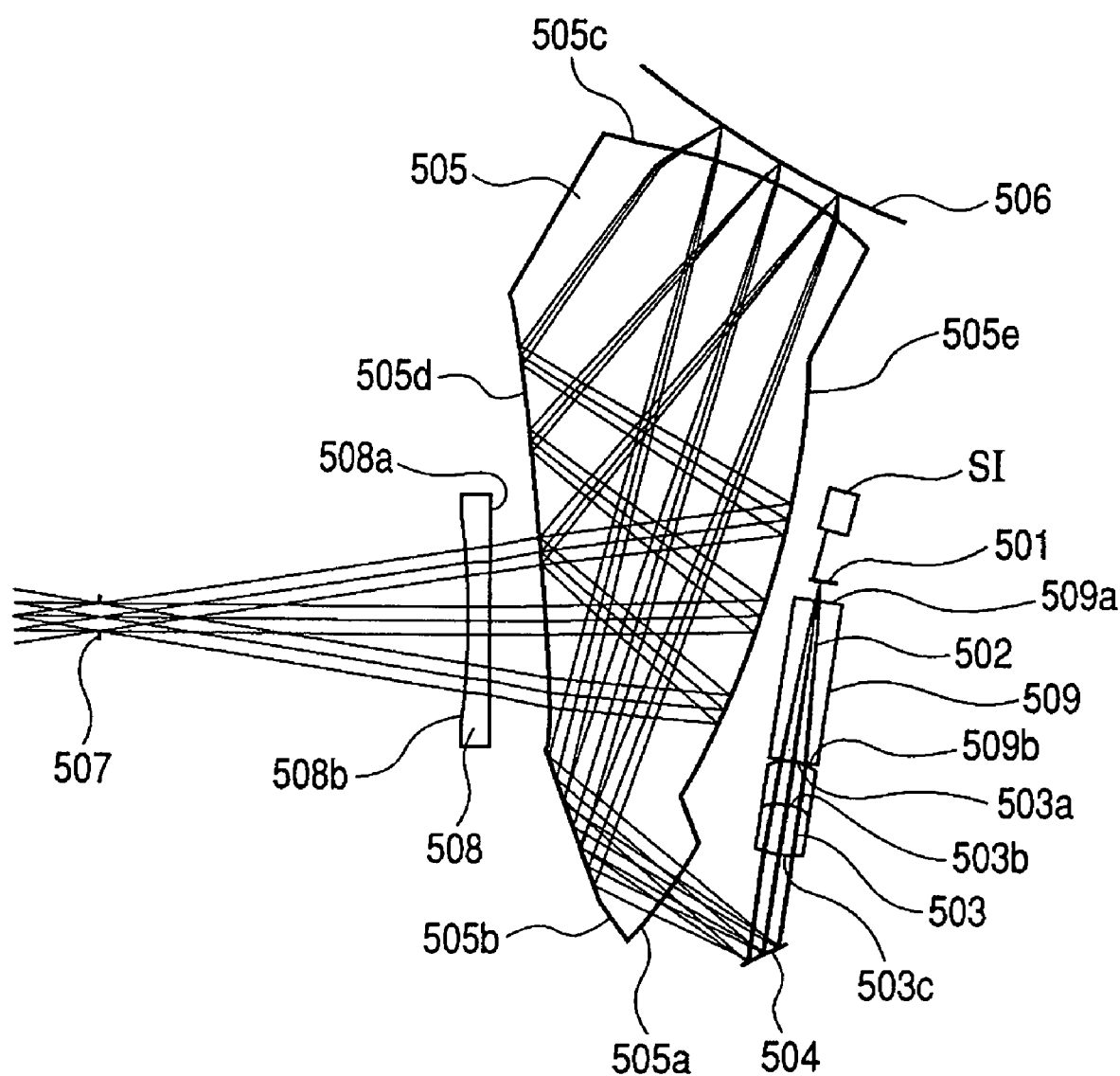
FIG. 5 is a perpendicular sectional diagram of an optical system for an image display apparatus in Embodiment 3.

FIG. 5 is a perpendicular sectional diagram of an optical system in Embodiment 3 for an image display apparatus of the present invention.

In FIG. 5, reference numeral 501 denotes a light source. Reference numeral 509 denotes a color combining member configured, for example, by a dichroic prism. Reference numeral 503 denotes a collecting optical system. Reference numeral 504 denotes a scanning member. Reference numeral 505 denotes a prism member. Reference numeral 506 denotes a scanned surface, being a reflective surface with the diffusion action. Reference numeral 508 denotes a lens member configured by a rotational symmetrical surface. Reference numeral 507 denotes the position of an exit pupil for the present image display apparatus where an eye of an observer shall be disposed. Reference character SI denotes a light source drive circuit.

The light source 501 is driven with a light source drive circuit SI based on an input signal corresponding to a displayed image to emit modulated light beams.

The light beam 502 emitted from the light source 501 is to become convergent light beam by a collecting optical system 503 through a color combining member 509 and enters the scanning member 504.

Reference numerals 509a and 509b denotes an entrance surface and an exit surface configuring the color combining member 509. Reference numerals 503a, 503b and 503c denote respective surfaces of cemented lens of a negative lens and a positive lens configuring the collecting optical system 503. Reference numerals 508a and 508b denote respective surfaces configuring a lens member.

The light beam 502 undergoes deflecting two-dimensionally by the scanning member 504 and enters the prism member 505. The light beam 502 having entered the prism member 505 passes the entrance surface (first optical surface) 505a, the refractive surface (second optical surface) 505b and the transmission surface (third optical surface) 505c in order from the side where the light beam from the light source 501 enters to enter the scanned surface 506. At that time, a two-dimensional image is formed on the scanned surface 506 by the scanning member 504.

The scanned surface 506 is a turn-back reflecting surface having a curvature. The light beam 502 forms an image in a spot on the scanned surface 506 or in the vicinity thereof to be reflected by the scanned surface 506 and enters the prism member 505 again through the surface of the transmission surface 505c. Having entered the prism member 505 again, the light beam 502 undergoes total reflection by the optical surface (fourth optical surface) 505d and is reflected further by the reflective surface (fifth optical surface) 505e and thereafter transmits the optical surface (sixth optical surface) 505d to exit from the prism member 505. Moreover, the light beam exited from the prism member 505 transmits the lens member 508 to enter the exit pupil 507 to become a conjugate point of the scanning member 504.

The observer locates his/her eyes in the vicinity of the exit pupil 507 and thereby can observe an image formed on the scanned surface 506.

Here, surfaces present in the optical path from the scanning member 504 and to the scanned surface 506 with the scanned surface 506 being as a center are three surfaces, that is, the optical surfaces 505a, 505b and 505c. Those optical surfaces 505a to 505c have action as a scanning optical system to form an image of the light beam 502 deflected by the scanning member 504 on the scanned surface 506. The optical surfaces 505c to 505e present in the optical path from the scanned surface 506 to the exit pupil and the lens member 508 have action as an ocular optical system for the observer to observe the image formed on the scanned surface 506.

The action of those two optical systems of the scanning optical system and the ocular optical system are realized by one prism member 505 and one lens member 508. And the scanning optical system and the ocular optical system have, in common, one optical surface 505c among a plurality of optical surfaces formed in one prism member 505. In the following, in Embodiment 3, a description involving the scanning optical system is to refer to the optical system with the optical surfaces 505a to 505c while a description involving the ocular optical system is to refer to the optical system with the optical surfaces 505c to 505e.

In order to form an light source image as an inverted image without forming an intermediate image thereof on the optical path of the scanning optical system, powers for the respective surfaces of the optical surfaces 505a to 505c have been weakened and the curvatures thereof have been made small.

In addition, the reflective surface closest to the scanned surface 506 in the optical paths in the scanning optical system and the surface closest to the exit pupil among the surfaces configuring the prism member 505 are separated into two optical surfaces 505b and 505d so as to make optical performance of the scanning optical system and the ocular optical system good.

Moreover, using the optical surface 505c in common for the scanning optical system and the ocular optical system, compactness of the whole optical system has been intended.

Here, the surfaces 505a to 505e of the prism optical system 505 are configured by rotational asymmetrical reflecting surfaces having no rotational symmetrical axis.

In addition, the reflective surface 505b and the total reflective surface 505d are configured by rotational asymmetrical reflecting surfaces described with respective equations having coefficients different from each other.

Thus employing a configuration in which an image of the light source 501 is formed only once on the optical path between the scanning member 504 and the exit pupil 507 being in a conjugate relation, the optical path from the scanning member 504 to the scanned surface 506 can be shortened to realize compactness of the optical system.

As in the present embodiment, the light beam having undergone two-dimensional deflecting by a scanning member is brought into image forming onto the scanned surface 506 in utilization of the reflective surface on the prism member 505 using a scanning optical system so as to shorten the optical length and make it easy to miniaturize an optical system.

Moreover, construction of the scanning optical system and the ocular optical system with an integral prism member 505 decreases the number of parts count for an optical system and simplifies the configuration of the whole optical system.

In addition, assigning a curvature to the scanned surface 506, and distinguishing field curvature and distortion, it will become possible to implement aberration correction to be assigned to the optical system and the scanned surface in a shared fashion. The surface shape of the scanned surface 506 is not limited to a spherical surface but the rotational symmetrical aspherical surface and rotational asymmetrical surface having no symmetric axis may be employed.

Moreover, in the present embodiment, by moving the lens member 508 in the direction of the center axis of the lens, the present embodiment will become capable of being caused to derive the diopter adjusting function. Of course likewise Embodiment 1, the diopter adjusting function may be also realized by moving the scanned surface 506 and the scanning member 504 in collaboration with each other. In addition, if the diopter adjusting function is not performed by the lens member 508, the lens member 508 is not limited to a rotational asymmetrical lens but such a lens that has an anamorphic aspheric surface or a rotational asymmetrical surface may be used.

In addition, in case of using an optical plastic for the prism member 505, protection thereof will become necessary since a plastic member is soft and vulnerable. With the lens member 508 made of glass being disposed between the prism member 505 and the observer, the lens member 508 can be assigned to play the role of the member protecting the prism member 505.

In the following, numerical embodiments corresponding to Embodiments 1 to 3 respectively will be described. In the descriptions in the embodiments, description was implemented in order from the side of the optical path at the side of the light source, but the numerical embodiments are to be described in such a style as to have followed up the light beam in the opposite direction from the side of the exit pupil (observer).

Tables 1 to 9 will describe numerical embodiments respectively. For entry, exit pupil locations are indicated as reference for the absolute coordinate system.

Three dimensional coordinate axes in the absolute coordinate system are allocated to Z axis, Y axis and X axis, which are defined as:

Z axis: a straight line passing the center (the absolute coordinate system origin) of the first surface from the center of the 0-th surface with the direction thereof being "positive"

Y axis: a straight line passing the center (the absolute coordinate system origin) of the first surface at 90 degrees in anticlockwise direction with respect to Z axis X axis: a straight line passing the origin and being perpendicular to Z-axis and Y-axis In addition, a local coordinate system is set so that the plane shape of the i-th surface configuring the optical system is expressed with an equation based on that local coordinate system. A tilt angle within the YZ plane of the i-th surface is expressed at an angle $\theta gi$ (unit: degree) to the Z axis of the absolute coordinate system in the anticlockwise direction being set as "positive". In the present embodiment, the tilt angle is set only within the YZ plane. The y and z axes of the local coordinate system (x, y, and z) on the i-th surface are within the Y and Z planes of the absolute coordinate system and tilts at the degree of $\theta gi$ within the Y and Z planes. Three dimensional coordinate axes in the local coordinate system are defined as:

z axis: a straight line passing the origin of the local coordinate at $\theta i$ in the anticlockwise direction to Z axis of the absolute coordinate system in the Y and the Z planes y axis: a straight line passing the origin of the local coordinate at 90 degrees in the anticlockwise direction with respect to the z direction within the YZ plane x axis: a straight line passing the origin and being perpendicular to the YZ plane Reference characters Ndi and vdi respectively denote a refractive index for the d-line of the medium between the i-th surface and the (i+1)-th surface and an Abbe constant.

The surface shape having no rotational symmetrical axis is expressed with a formula as described below.

$$z = \frac{cr^2}{1+\sqrt{1-(1+k)c^2r^2}} + c2x + c3y + c4x^2 + c5xy + c6y^2 + c7x^3 +$$
$$c8x^2y + c9xy^2 + c10y^3 + c11x^4 + c12x^3y + c13x^2y^2 + c14xy^3 +$$
$$c15y^4 + c16x^5 + c17x^4y + c18x^3y^2 + c19x^2y^3 + c20xy^4 + c21y^5 +$$
$$c22x^6 + c23x^5y + c24x^4y^2 + c25x^3y^3 + c26x^2y^4 + c27xy^5 +$$
$$c28y^6 + c29x^7 + c30x^6y + c31x^5y^2 + c32x^4y^3 + c33x^3y^4 +$$
$$c34x^2y^5 + c35xy^6 + c36y^7 + c37x^8 + c38x^7y + c39x^6y^2 +$$
$$c40x^5y^3 + c41x^4y^4 + c42x^3y^5 + c43x^2y^6 + c44xy^7 + c45y^8$$

That equation is an equation of defining the surface shape with the local coordinate (x, y, and z) of the i-th surface.

In addition, in the above described equation, the term related to the odd order of x in the local coordinate system is set to 0 and thereby a surface being symmetrical to the yz plane can be derived.

In addition, in the present embodiment, a rotational symmetrical aspherical surface having rotational symmetry is used for a part of surfaces.

$$z = \frac{(h^2)/R_i}{1+\{1-(1+k)h^2/Ri^2\}^{1/2}} + Ah^2 + Bh^4 + Ch^6 + Dh^8 + Eh^{10} + \cdots$$

where, $$h^2 = x^2 + y^2$$

That rotational symmetrical aspherical surface is also defined in respective local coordinate systems.

The eccentric surfaces in respective embodiments only have undergone shift eccentricity in the y axis direction at the surface vertex and tilt eccentricity about the x axis. Therefore, the same sectional plane is derived from an ordinary meridional sectional plane and a local meridional sectional plane, but an ordinary sagittal sectional plane is different from a local sagittal sectional plane.

Tables 1 to 9 in the numerical embodiments represent local curvature radius rx, ry (curvature radius on the local meridional sectional plane and curvature radius on the local sagittal sectional plane) on hit points of respective optical surfaces of the light beam at the image center, local plane interval d (distance between two hit points of a certain plane and the subsequent plane (distance on a reference light beam, or a value without air conversion)), eccentric amount "shift, tilt", refractive index nd, and Abbe constant νd.

In addition, reference characters XYP denote a surface having no rotational symmetrical axis, reference characters SPH denote a spherical surface and reference characters ASP denote a rotational symmetrical aspherical surface. Respective coefficients of the equation expressing a surface shape having no rotational symmetrical axis and of the equation expressing a rotational symmetrical aspherical surface are shown at the bottom space in the table. "M" indicates that the surface is a reflective surface.

The following Numerical Embodiments 1 to 3 respectively correspond to Embodiments 1 to 3.

Numerical Embodiment 1

An image display apparatus of Numerical Embodiment 1 features observer's horizontal field angle ±12 degrees (perpendicular to the sheet plane) and perpendicular field angle ±9 degrees (within the sheet plane).

The scanning member is the 13-th surface (corresponding to 104 in Embodiment 1), featuring deflection angle in the horizontal direction (and oscillating about an axis within the sheet plane in the direction perpendicular to the sheet plane) ±5.49 degrees, and deflection angle in the perpendicular direction (and oscillating about an axis perpendicular to the sheet plane within the sheet plane) ±4.118 degrees.

The entrance pupil diameter is 1.35 mm.

The drawing and corresponding reference numerals in FIG. 1 are as follows:

| | |
|---|---|
| pupil 107 | surface number 1 |
| surface 105d | surface numbers 2, 4 |
| surface 105e | surface number 3 |
| surface 105c | surface numbers 5, 7 |
| surface 106 | surface number 6 |
| surface 105b | surface number 8 |
| surface 105a | surface number 9 |
| surface 104 | surface number 10 |
| surface 103c | surface number 11 |
| surface 103b | surface number 12 |
| surface 103a | surface number 13 |
| surface 108b | surface number 14 |
| surface 108a | surface number 15 |
| light source 101 | surface number 16 |

TABLE 1

| type | sur | Yg | Zg | θg | ry | rx | shift | tilt | nd | vd |
|---|---|---|---|---|---|---|---|---|---|---|
| | 1 | 0.0000 | 0.0000 | 0.0000 | ∞ | ∞ | 0.000 | 0.000 | 1.000 | |
| XYP | 2 | 12.1643 | 24.3397 | 10.1843 | 0.0000 | 0.0000 | 12.164 | 10.184 | 1.530 | 55.80 |
| XYP-M | 3 | −11.1154 | 31.2221 | −29.2310 | −379.2978 | −379.2978 | −11.115 | −29.231 | −1.530 | 55.80 |
| XYP-M | 4 | 12.1643 | 24.3397 | 10.1843 | ∞ | ∞ | 12.164 | 10.184 | 1.530 | 55.80 |
| XYP | 5 | 23.5325 | 30.85889 | 78.1234 | ∞ | ∞ | 23.532 | 78.123 | 1.000 | |
| M | 6 | 23.2541 | 37.32731 | 60.6645 | ∞ | ∞ | 23.254 | 60.665 | −1.000 | |
| XYP | 7 | 23.5325 | 30.8589 | 78.1234 | ∞ | ∞ | 23.532 | 78.123 | −1.530 | 55.80 |
| XYP-M | 8 | 0.4737 | 23.7503 | 18.7396 | −5940.4104 | −5940.4104 | 0.473 | 18.740 | 1.530 | 55.80 |
| XYP | 9 | −15.5333 | 29.02948 | −49.7351 | 7.4038 | 7.4038 | −16.533 | −49.735 | 1.000 | |
| M | 10 | −17.1864 | 34.76619 | −76.6161 | 0.0000 | 0.0000 | −17.186 | −76.616 | −1.000 | |
| SPH | 11 | −12.6051 | 36.7692 | −66.3839 | −5.7818 | −5.7818 | −12.605 | −66.384 | −1.516 | 64.14 |

TABLE 1-continued

| type | sur | Yg | Zg | θg | ry | rx | shift | tilt | nd | vd |
|---|---|---|---|---|---|---|---|---|---|---|
| SPH | 12 | −10.3757 | 37.7440 | −66.3839 | 2.7379 | 2.7379 | −10.37 | −56.384 | −1.699 | 30.13 |
| SPH | 13 | −9.6812 | 38.0476 | −66.3839 | 5.6982 | 5.6982 | −9.681 | −56.384 | −1.000 | |
|  | 14 | −9.5896 | 38.0877 | −66.3839 | ∞ | ∞ | −9.590 | −66.384 | −1.516 | 64.14 |
|  | 15 | −2.2596 | 41.2926 | −66.3839 | ∞ | ∞ | −2.260 | −66.384 | −1.000 | |
|  | 16 | −0.8852 | 41.8935 | −66.3839 | ∞ | ∞ | −0.885 | −65.384 | −1.000 | |

TABLE 2 surface no. = 2
XYP
- $rdy = 1.000e+018$   $c4 = 0.000e+000$   $c6 = 0.000e+000$   $c8 = -9.933e-003$   $c10 = -4.932e-004$
- $c11 = -8.388e-005$  $c13 = 0.000e+000$  $c17 = 1.214e-005$  $c19 = 0.000e+000$  $c21 = 2.493e-007$
- $c22 = -8.821e-008$  $c24 = -4.103e-007$ $c26 = 2.244e-008$  $c28 = 1.474e-008$  $c30 = 0.000e+000$
- $c32 = 0.000e+000$   $c34 = 0.000e+000$  $c36 = 0.000e+000$  $c37 = 0.000e+000$  $c39 = 0.000e+000$
- $c41 = 0.000e+000$   $c43 = 0.000e+000$  $c45 = 0.000e+000$ surface no. = 3
XYP
- $rdy = -3.793e+002$  $c4 = 0.000e+000$   $c6 = 0.000e+000$   $c8 = -5.676e-003$  $c10 = -6.193e-005$
- $c11 = -1.516e-006$  $c13 = 0000e+000$   $c17 = 1.526e-006$  $c19 = 0.000e+000$  $c21 = -2.559e-008$
- $c22 = -1.804e-009$  $c24 = -1.664e-008$ $c26 = -9.598e-009$ $c28 = 1.670e-008$  $c30 = -9.622e-010$
- $c32 = -5.279e-011$  $c34 = -1.102e-010$ $c36 = -7.324e-012$ $c37 = -4.409e-011$ $c39 = 1.014e-010$
- $c41 = -2.801e-012$  $c43 = 7.994e-012$  $c45 = 2.108e-013$ surface no. = 4
XYP
- $rdy = 1.000e+018$   $c4 = 0.000e+000$   $c6 = 0.000e+000$   $c8 = -9.933e-003$  $c10 = -4.932e-004$
- $c11 = -8.388e-005$  $c13 = 0.000e+000$  $c17 = 1.214e-005$  $c19 = 0.000e+000$  $c21 = 2.493e-007$
- $c22 = -8.821e-008$  $c24 = -4.103e-007$ $c26 = 2.244e-008$  $c28 = 1.474e-008$  $c30 = 0.000e+000$
- $c32 = 0.000e+000$   $c34 = 0.000e+000$  $c36 = 0.000e+000$  $c37 = 0.000e+000$  $c39 = 0.000e+000$
- $c41 = 0.000e+000$   $c43 = 0.000e+000$  $c45 = 0.000e+000$ surface no. = 5
XYP
- $rdy = 1.000e+018$   $c4 = 0.000e+000$   $c6 = 0000e+000$    $c8 = -8.853e-003$  $c10 = 6.126e-003$
- $c11 = -1.499e-004$  $c13 = 0.000e+000$  $c17 = -1.823e-005$ $c19 = 0.000e+000$  $c21 = 8.709e-005$
- $c22 = -2.144e-006$  $c24 = 4.517e-007$  $c26 = 5.587e-007$  $c28 = 2.563e-006$  $c30 = 1.696e-007$
- $c32 = 1.200e-007$   $c34 = 0.000e+000$  $c36 = 1.340e-009$  $c37 = 5.715e-008$  $c39 = 5.999e-009$
- $c41 = 6.403e-009$   $c43 = -2.462e-009$ $c45 = 1.383e-010$

Figure 6A:
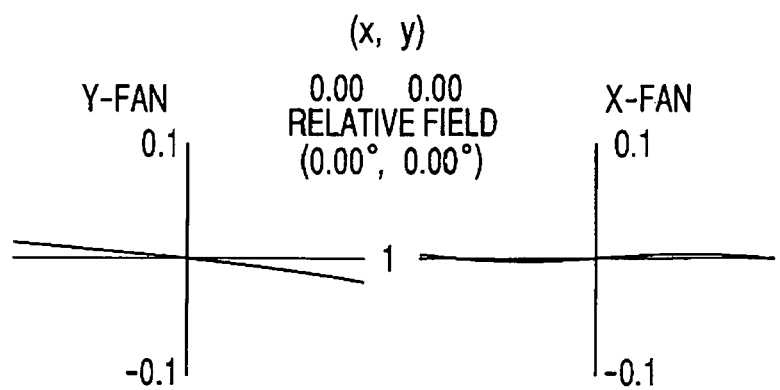
FIGS. 6A, 6B, 6C and 6D are lateral aberration graphs on surfaces undergoing scanning in an ocular optical system in Embodiment 1.
Figure 6B:
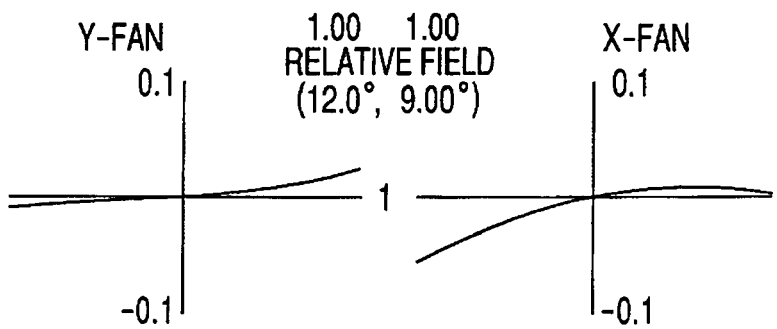
Figure 6C:
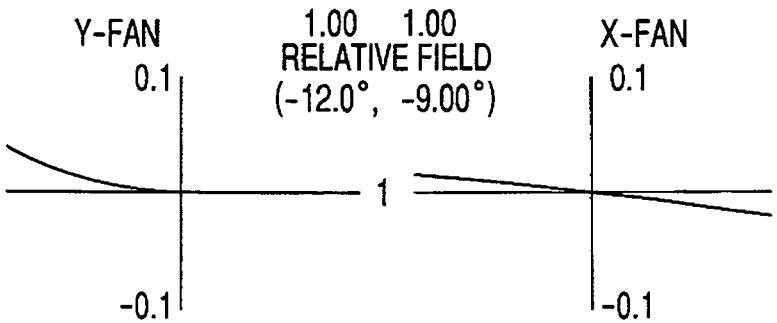
Figure 6D:
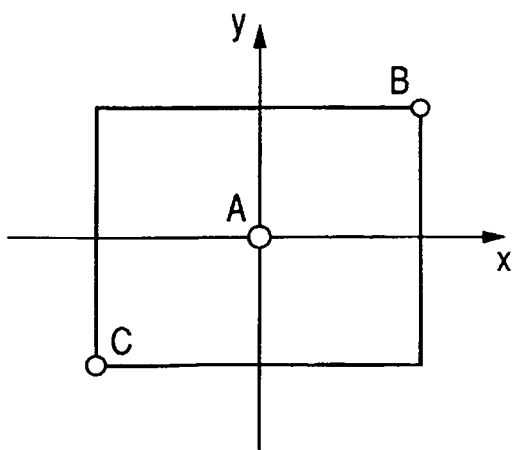

TABLE 3 surface no. = 7
XYP
- $rdy = 1.000e+018$   $c4 = 0.000e+000$   $c6 = 0.000e+000$   $c8 = -8.853e-003$  $c10 = 6.126e-003$
- $c11 = -1.499e-004$  $c13 = 0.000e+000$  $c17 = -1.823e-005$ $c19 = 0.000e+000$  $c21 = 8.709e-005$
- $c22 = -2.144e-006$  $c24 = 4.517e-007$  $c26 = 5.587e-007$  $c28 = 2.563e-006$  $c30 = 1.696e-007$
- $c32 = 1.200e-007$   $c34 = 0.000e+000$  $c36 = 1.340e-009$  $c37 = 5.715e-008$  $c39 = 5.999e-009$
- $c41 = 6.403e-009$   $c43 = -2.462e-009$ $c45 = 1.383e-010$ surface no. = 8
XYP
- $rdy = -5.940e+003$  $c4 = 0.000e+000$   $c6 = 0.000e+000$   $c8 = -4.093e-003$  $c10 = -2.934e-004$
- $c11 = -2.926e-004$  $c13 = 0.000e+000$  $c17 = -1.515e-005$ $c19 = 0.000e+000$  $c21 = -3.020e-007$
- $c22 = -3.326e-005$  $c24 = -4.093e-006$ $c26 = -1.712e-007$ $c28 = -2.666e-009$ $c30 = -3.326e-007$
- $c32 = 2.454e-008$   $c34 = -2.076e-009$ $c36 = -1.547e-011$ $c37 = -9.269e-009$ $c39 = 2.313e-007$
- $c41 = -4.279e-009$  $c43 = 3.452e-011$  $c45 = -2.163e-013$ surface no. = 9
XYP
- $rdy = 7.404e+000$   $c4 = 0.000e+000$   $c6 = 0.000e+000$   $c8 = -1.118e-001$  $c10 = 4.559e-003$
- $c11 = -1.456e-003$  $c13 = 0.000e+000$  $c17 = -2.918e-003$ $c19 = 0.000e+000$  $c21 = -6.299e-004$
- $c22 = 4.347e-005$   $c24 = 1.932e-004$  $c26 = -3.394e-004$ $c28 = 7.744e-005$  $c30 = 2.413e-005$
- $c32 = 1.309e-006$   $c34 = 5.942e-005$  $c36 = 7.759e-007$  $c37 = 1.550e-005$  $c39 = -1.730e-005$
- $c41 = -5.800e-006$  $c43 = -4.614e-006$ $c45 = -6.240e-007$ surface no. = 12
SPH   $rdy = -5.782e+000$
surface no. = 13
SPH   $rdy = 2.738e+000$
surface no. = 14
SPH   $rdy = 5.698e+000$ FIGS. 6A, 6B and 6C are lateral aberration graphs on scanning surface 106 (surface number 7) in an ocular optical system in the present embodiment. FIGS. 6A to 6C are lateral aberration graphs in respective position s of the screen center A, the right upper end B and the left bottom C in FIG. 6D when an observer places his/her eyes in the vicinity of the pupil 107 (surface number 1) of FIG. 1 respectively. The wavelength in the present aberration graphs is 587.56 nm.

Numerical Embodiment 2

An image display apparatus of Numerical Embodiment 2 features observer's horizontal image angle ±12 degrees (perpendicular to the sheet plane) and perpendicular image angle ±9 degrees (within the sheet plane).

The scanning member is the 15-th surface (corresponding to 404 in Embodiment 2), featuring deflection angle in the horizontal direction (oscillating about an axis within the sheet plane in the direction perpendicular to the sheet plane) ±5.49 degrees, and deflection angle in the perpendicular direction (oscillating about an axis perpendicular to the sheet plane within the sheet plane) ±4.118 degrees.

The entrance pupil diameter is 1.35 mm.

The drawing and corresponding reference numerals in FIG. 4 are as follows:

| | |
|---|---|
| pupil 407 | surface number 1 |
| surface 408b | surface number 2 |
| surface 408a | surface number 3 |
| surface 405d | surface numbers 4, 6 |
| surface 405e | surface number 5 |
| surface 405c | surface numbers 7, 9 |
| surface 406 | surface number 8 |
| surface 405b | surface number 10 |
| surface 405a | surface number 11 |
| surface 404 | surface number 12 |
| surface 403c | surface number 13 |
| surface 403b | surface number 14 |
| surface 403a | surface number 15 |
| surface 409b | surface number 16 |
| surface 409a | surface number 17 |
| light source 401 | surface number 18 |

TABLE 4

| type | sur | Yg | Zg | θg | ry | rx | shift | tilt | nd | vd |
|---|---|---|---|---|---|---|---|---|---|---|
| | 1 | 0.0000 | 0.0000 | 0.0000 | ∞ | ∞ | 0.000 | 0.000 | 1.000 | |
| SPH | 2 | 0.0000 | 18.0000 | 0.0000 | −90.5185 | −90.5185 | 0.000 | 0.000 | 1.516 | 64.14 |
| SPH | 3 | 0.0000 | 19.0000 | 0.0000 | 54.0494 | 54.0494 | 0.000 | 0.000 | 1.000 | |
| XYP | 4 | 11.7305 | 20.0263 | 11.6154 | ∞ | ∞ | 11.731 | 11.615 | 1.530 | 55.80 |
| XYP-M | 5 | −11.4053 | 27.5211 | −29.0051 | −248.5652 | −248.5652 | −11.405 | −29.005 | −1.530 | 55.80 |
| XYP-M | 6 | 11.7305 | 20.0263 | 11.6154 | ∞ | ∞ | 11.731 | 11.615 | 1.530 | 55.80 |
| XYP | 7 | 23.4877 | 26.62997 | 79.1452 | ∞ | ∞ | 23.488 | 79.145 | 1.000 | |
| M | 8 | 25.4454 | 35.56850 | 53.0428 | ∞ | ∞ | 25.445 | 58.043 | −1.000 | |
| XYP | 9 | 23.4877 | 26.6300 | 79.1452 | ∞ | ∞ | 23.488 | 79.145 | −1.530 | 55.80 |
| XYP-M | 10 | −1.5786 | 20.5225 | 18.9352 | ∞ | ∞ | −1.579 | 18.935 | 1.530 | 55.80 |
| XYP | 11 | −14.7245 | 24.71140 | −42.7509 | 7.3222 | 7.3222 | −14.725 | −42.751 | 1.000 | |
| M | 12 | −14.2150 | 30.92551 | −69.8922 | ∞ | ∞ | −14.215 | −69.892 | −1.000 | |
| SPH | 13 | −9.4308 | 32.3784 | −73.1078 | −9.3998 | −9.3998 | −9.431 | −73.108 | −1.516 | 64.14 |
| SPH | 14 | −7.0386 | 33.1048 | −73.1078 | 2.0704 | 2.0704 | −7.039 | −73.108 | −1.699 | 30.13 |
| SPH | 15 | −5.1249 | 33.6859 | −73.1078 | 4.0555 | 4.0555 | −5.125 | −73.108 | −1.000 | |
| | 16 | −5.0292 | 33.7150 | −73.1078 | ∞ | ∞ | −5.029 | −73.108 | −1.516 | 64.14 |
| | 17 | 2.6256 | 36.0396 | −73.1078 | ∞ | ∞ | 2.626 | −73.108 | −1.000 | |
| | 18 | 4.0609 | 36.4754 | −73.1078 | ∞ | ∞ | 4.061 | −73.108 | −1.000 | |

TABLE 5 surface no. = 2
SPH         rdy = −9.052e+001
surface no. = 3
SPH         rdy = 5.405e+001
surface no. = 4
XYP         rdy = 1.000e+018     c4 = 0.000e+000      c6 = 0.000e+000      c8 = −7.811e−003     c10 = 3.988e−004
            c11 = −3.920e−005    c13 = 0.000e+000     c17 = −3.750e−006    c19 = 0.000e+000     c21 = −1.155e−007
            c22 = 5.392e−009     c24 = −1.533e−007    c26 = −4.317e−008    c28 = 5.832e−009     c30 = 0.000e+000
            c32 = 0.000e+000     c34 = 0.000e+000     c36 = 0.000e+000     c37 = 0.000e+000     c39 = 0.000e+000
            c41 = 0.000e+000     c43 = 0.000e+000     c45 = 0.000e+000
surface no. = 5
XYP         rdy = −2.486e+002    c4 = 0.000e+000      c6 = 0.000e+000      c8 = −6.229e−003     c10 = −6.075e−005
            c11 = −4.338e−006    c13 = 0.000e+000     c17 = 1.463e−005     c19 = 0.000e+000     c21 = −1.439e−008
            c22 = 2.834e−009     c24 = −9.732e−009    c26 = −1.845e−009    c28 = −1.015e−009    c30 = 0.000e+000
            c32 = 0.000e+000     c34 = 0.000e+000     c36 = 0.000e+000     c37 = 0.000e+000     c39 = 0.000e+000
            c41 = 0.000e+000     c43 = 0.000e+000     c45 = 0.000e+000
surface no. = 6
XYP         rdy = 1.000e+018     c4 = 0.000e+000      c6 = 0.000e+000      c8 = −7.811e−003     c10 = −3.988e−004
            c11 = −3.920e−005    c13 = 0.000e+000     c17 = −3.750e−006    c19 = 0.000e+000     c21 = −1.155e−007
            c22 = 5.392e−009     c24 = −1.533e−007    c26 = −4.317e−008    c28 = 5.832e−009     c30 = 0.000e+000
            c32 = 0.000e+000     c34 = 0.000e+000     c36 = 0.000e+000     c37 = 0.000e+000     c39 = 0.000e+000
            c41 = 0.000e+000     c43 = 0.000e+000     c45 = 0.000e+000

TABLE 6 surface no. = 7
XYP         rdy = 1.000e+018     c4 = 0.000e+000      c6 = 0.000e+000      c8 = −8.517e−003     c10 = 6.033e−003
            c11 = −4.018e−005    c13 = 0.000e+000     c17 = −1.976e−004    c19 = 0.000e+000     c21 = 8.790e−005
            c22 = −3.340e−007    c24 = 3.003e−007     c26 = −1.374e−006    c28 = 2.558e−006     c30 = 0.000e+000
            c32 = 0.000e+000     c34 = 0.000e+000     c36 = 0.000e+000     c37 = 0.000e+000     c39 = 0.000e+000
            c41 = 0.000e+000     c43 = 0.000e+000     c45 = 0.000e+000

TABLE 6-continued

| surface no. = | 9 | | | | |
|---|---|---|---|---|---|
| XYP | rdy = 1.000e+018 | c4 = 0.000e+000 | c6 = 0.000e+000 | c8 = −8.517e−003 | c10 = 6.033e−003 |
| | c11 = −4.018e−005 | c13 = 0.000e+000 | c17 = −1.976e−004 | c19 = 0.000e+000 | c21 = 8.790e−005 |
| | c22 = −3.340e−007 | c24 = 3.003e−007 | c26 = −1.374e−006 | c28 = 2.558e−006 | c30 = 0.000e+000 |
| | c32 = 0.000e+000 | c34 = 0.000e+000 | c36 = 0.000e+000 | c37 = 0.000e+000 | c39 = 0.000e+000 |
| | c41 = 0.000e+000 | c43 = 0.000e+000 | c45 = 0.000e+000 | | |
| surface no. = | 10 | | | | |
| XYP | rdy = 1.000e+018 | c4 = 0.000e+000 | c6 = 0.000e+000 | c8 = −3.600e−003 | c10 = −3.388e−004 |
| | c11 = −1.921e−005 | c13 = 0.000e+000 | c17 = −4.464e−005 | c19 = 0.000e+000 | c21 = −3.123e−007 |
| | c22 = −4.517e−005 | c24 = −6.258e−006 | c26 = 6.588e−008 | c28 = −1.048e−008 | c30 = −4.735e−007 |
| | c32 = 5.031e−009 | c34 = −3.790e−008 | c36 = 5.244e−010 | c37 = −4.209e−008 | c39 = 8.057e−007 |
| | c41 = −2.157e−008 | c43 = −2.503e−009 | c45 = 5.173e−011 | | |
| surface no. = | 11 | | | | |
| XYP | rdy = 7.322e+000 | c4 = 0.000e+000 | c6 = 0.000e+000 | c8 = −1.150e−001 | c10 = 5.308e−003 |
| | c11 = −3.849e−003 | c13 = 0.000e+000 | c17 = −2.967e−003 | c19 = 0.000e+000 | c21 = −6.309e−004 |
| | c22 = 2.211e−004 | c24 = 2.150e−004 | c26 = −3.368e−004 | c28 = 7.231e−005 | c30 = 4.611e−005 |
| | c32 = 9.801e−007 | c34 = 5.512e−005 | c36 = −1.032e−007 | c37 = 1.890e−005 | c39 = −2.998e−005 |
| | c41 = −5.491e−006 | c43 = −4.154e−006 | c45 = −4.565e−007 | | |
| surface no. = | 13 | | | | |
| SPH | rdy = −9.400e+000 | | | | |
| surface no. = | 14 | | | | |
| SPH | rdy = 2.070e+000 | | | | |
| surface no. = | 15 | | | | |
| SPH | rdy = 4.055e+000 | | | | |

Figure 7A:
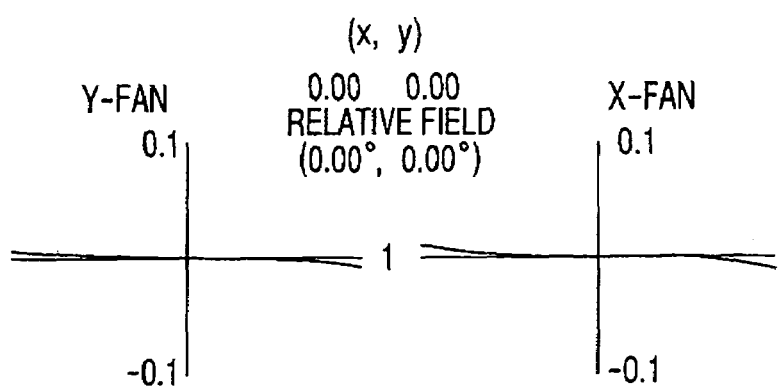
FIGS. 7A, 7B, 7C and 7D are lateral aberration graphs on surfaces undergoing scanning in an ocular optical system in Embodiment 2.
Figure 7B:
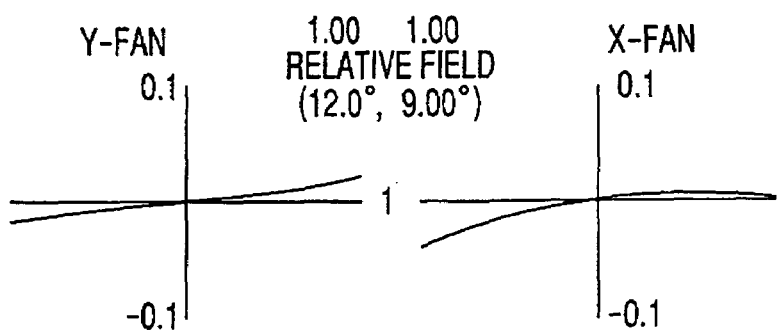
Figure 7C:
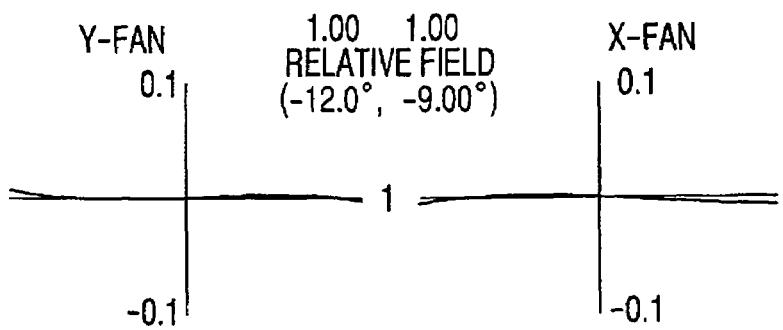
Figure 7D:
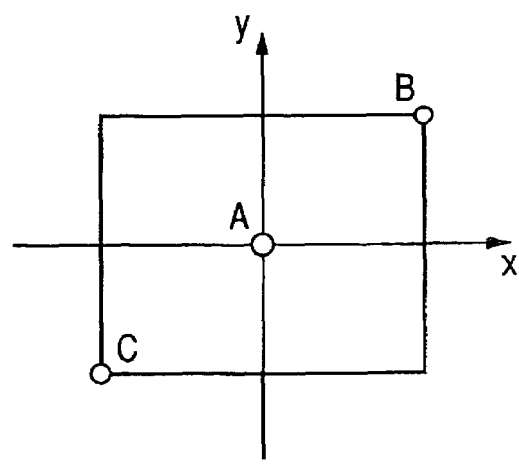

FIGS. 7A, 7B and 7C are lateral aberration graphs on scanning surface 406 (surface number 9) in an ocular optical system in the present embodiment. FIGS. 7A to 7C are lateral aberration graphs in respective positions of the screen center A, the right upper end B and the left bottom C in FIG. 7D when an observer places his/her eyes in the vicinity of the pupil 407 (surface number 1) of FIG. 4 respectively. The wavelength in the present aberration graphs is 587.56 nm.

Numerical Embodiment 3

An image display apparatus of Numerical Embodiment 3 features observer's horizontal field angle ±12 degrees (perpendicular to the sheet plane) and perpendicular field angle ±9 degrees (within the sheet plane).

The scanning member is the 15-th surface (corresponding to 504 in Embodiment 3), featuring deflection angle in the horizontal direction (oscillating about an axis within the sheet surface in the direction perpendicular to the sheet plane) ±5.49 degrees, and deflection angle in the perpendicular direction (oscillating about an axis in the direction perpendicular to the sheet plane within the sheet plane) ±4.118 degrees.

The entrance pupil diameter is 1.35 mm. The drawing and corresponding reference numerals in FIG. 5 are as follows:

| pupil 507 | surface number 1 |
|---|---|
| surface 508b | surface number 2 |
| surface 508a | surface number 3 |
| surface 505d | surface numbers 4, 6 |
| surface 505e | surface number 5 |
| surface 505c | surface numbers 7, 9 |
| surface 506 | surface number 8 |
| surface 505b | surface number 10 |
| surface 505a | surface number 11 |
| surface 504 | surface number 12 |
| surface 503c | surface number 13 |
| surface 503b | surface number 14 |
| surface 503a | surface number 15 |
| surface 509b | surface number 16 |
| surface 509a | surface number 17 |
| light source 501 | surface number 18 |

TABLE 7

| type | sur | Yg | Zg | θg | ry | rx | shift | tilt | nd | vd |
|---|---|---|---|---|---|---|---|---|---|---|
| | 1 | 0.0000 | 0.0000 | 0.0000 | ∞ | ∞ | 0.000 | 0.000 | 1.000 | |
| | 2 | 0.0000 | 18.0000 | 0.0000 | −45.8136 | −45.8135 | 0.000 | 0.000 | 1.516 | 64.14 |
| AL | 3 | 0.0000 | 19.00000 | 0.0000 | −904.7406 | −904.7406 | 0.000 | 0.000 | 1.000 | |
| XYP | 4 | 13.0930 | 20.5035 | 8.8240 | ∞ | ∞ | 13.093 | 8.824 | 1.530 | 55.80 |
| XYP-M | 5 | −10.5394 | 27.1414 | −30.9246 | −217.8025 | −217.8025 | −10.539 | −30.925 | −1.530 | 55.80 |
| XYP-M | 6 | 13.0930 | 20.5035 | 8.8240 | ∞ | ∞ | 13.093 | 8.824 | 1.530 | 55.80 |
| XYP | 7 | 23.2320 | 27.06239 | 80.2418 | ∞ | ∞ | 23.232 | 80.242 | 1.000 | |
| AL-M | 8 | 23.6644 | 30.94466 | 56.9479 | 69.1155 | 69.1155 | 23.664 | 56.943 | −1.000 | |
| XYP | 9 | 23.2320 | 27.0624 | 80.2418 | ∞ | ∞ | 23.232 | 80.242 | −1.530 | 55.80 |
| XYP-M | 10 | −2.7517 | 20.7498 | 17.8855 | 405.5085 | 405.5085 | −2.752 | 17.885 | 1.530 | 55.80 |
| XYP | 11 | −12.457 | 28.17393 | −34.5795 | 8.8918 | 8.8918 | −12.457 | −34.580 | 1.000 | |
| M | 12 | −16.4084 | 32.16295 | −66.6227 | ∞ | ∞ | −16.408 | −66.623 | −1.000 | |
| | 13 | −11.4649 | 32.9126 | −81.3773 | −5.8336 | −6.8336 | −11.465 | −81.377 | −1.516 | 64.14 |
| | 14 | −8.9932 | 33.2874 | −81.3773 | 2.5733 | 2.5733 | −8.993 | −81.377 | −1.699 | 30.13 |
| | 15 | −7.0158 | 33.5872 | −81.3773 | 4.9693 | 4.9693 | −7.016 | −81.377 | −1.000 | |

TABLE 7-continued

| type | sur | Yg | Zg | θg | ry | rx | shift | tilt | nd | vd |
|---|---|---|---|---|---|---|---|---|---|---|
| | 16 | −6.9169 | 33.6022 | −81.3773 | ∞ | ∞ | −6.917 | −81.37 | −1.516 | 64.14 |
| | 17 | 0.9926 | 34.3016 | −81.3773 | ∞ | ∞ | 0.993 | −81.377 | −1.000 | |
| | 18 | 2.0034 | 34.9549 | −81.3773 | ∞ | ∞ | 2.003 | −81.377 | −1.000 | |

TABLE 8

| surface no. = 2 | | | | | |
|---|---|---|---|---|---|
| SPH | rdy = −4.581e+001 | | | | |
| surface no. = 3 | | | | | |
| ASP | rdy = −9.047e+002 | a = −1.887e+005 | b = −6.273e−007 | c = 2.063e−008 | d = −1.039e−010 |
| | e = −6.638e−012 | f = 8.397e−014 | | | |
| surface no. = 4 | | | | | |
| XYP | rdy = 1.000e+018 | c4 = 0.000e+000 | c6 = 0.000e+000 | c8 = −1.014e−002 | c10 = −7.556e−004 |
| | c11 = −7.603e−005 | c13 = 0.000e+000 | c17 = −7.514e−005 | c19 = 0.000e+000 | c21 = 5.985e−008 |
| | c22 = −2.681e−008 | c24 = −3.244e−007 | c26 = −2.968e−008 | c28 = 8.541e−009 | c30 = 0.000e+000 |
| | c32 = 0.000e+000 | c34 = 0.000e+000 | c36 = 0.000e+000 | c37 = 0.000e+000 | c39 = 0.000e+000 |
| | c41 = 0.000e+000 | c43 = 0.000e+000 | c45 = 0.000e+000 | | |
| surface no. = 5 | | | | | |
| XYP | rdy = −2.178e+002 | c4 = 0.000e+000 | c6 = 0.000e+000 | c8 = −6.573e−003 | c10 = −6.176e−005 |
| | c11 = 5.776e−007 | c13 = 0.000e+000 | c17 = 5.691e−005 | c19 = 0.000e+000 | c21 = −5.299e−007 |
| | c22 = 8.165e−009 | c24 = 3.674e−008 | c26 = 4.405e−008 | c28 = 9.900e−009 | c30 = 0.000e+000 |
| | c32 = 0.000e+000 | c34 = 0.000e+000 | c36 = 0.000e+000 | c37 = 0.000e+000 | c39 = 0.000e+000 |
| | c41 = 0.000e+000 | c43 = 0.000e+000 | c45 = 0.000e+000 | | |
| surface no. = 6 | | | | | |
| XYP | rdy = 1.000e+018 | c4 = 0.000e+000 | c6 = 0.000e+000 | c8 = −1.014e−002 | c10 = −7.556e−004 |
| | c11 = −7.603e−005 | c13 = 0.000e+000 | c17 = −7.514e−005 | c19 = 0.000e+000 | c21 = −5.985e−008 |
| | c22 = −2.681e−008 | c24 = −3.244e−007 | c26 = −2.968e−008 | c28 = 8.541e−009 | c30 = 0.000e+000 |
| | c32 = 0.000e+000 | c34 = 0.000e+000 | c36 = 0.000e+000 | c37 = 0.000e+000 | c39 = 0.000e+000 |
| | c41 = 0.000e+000 | c43 = 0.000e+000 | c45 = 0.000e+000 | | |

TABLE 9

| surfce no. = 7 | | | | | |
|---|---|---|---|---|---|
| XYP | rdy = 1.000e+018 | c4 = 0.000e+000 | c6 = 0.000e+000 | c8 = −1.251e−002 | c10 = 5.496e−003 |
| | c11 = −1.261e−004 | c13 = 0.000e+000 | c17 = −3.921e−004 | c19 = 0.000e+000 | c21 = 8.339e−005 |
| | c22 = 1.711e−006 | c24 = 3.051e−006 | c26 = −1.227e−006 | c28 = 2.353e−006 | c30 = 0.0000e+000 |
| | c32 = 0.000e+000 | c34 = 0.000e+000 | c36 = 0.000e+000 | c37 = 0.000e+000 | c39 = 0.000e+000 |
| | c41 = 0.000e+000 | c43 = 0.000e+000 | c45 = 0.000e+000 | | |
| surface no. = 8 | | | | | |
| ASP | rdy = 6.912e+001 | a = 8.052e−005 | b = −1.400e−006 | c = 4.487e−009 | d = 1.067e−010 |
| | e = 2.102e−012 | f = −4.987e−014 | | | |
| surface no. = 9 | | | | | |
| XYP | rdy = 1.000e+018 | c4 = 0.000e+000 | c6 = 0.000e+000 | c8 = −1.251e−002 | c10 = 5.496e−003 |
| | c11 = −1.261e−004 | c13 = 0.000e+000 | c17 = −3.921e−004 | c19 = 0.000e+000 | c21 = 8.339e−005 |
| | c22 = 1.711e−006 | c24 = 3.051e−006 | c26 = −1.227e−006 | c28 = 2.353e−006 | c30 = 0.000e+000 |
| | c32 = 0.000e+000 | c34 = 0.000e+000 | c36 = 0.000e+000 | c37 = 0.000e+000 | c39 = 0.000e+000 |
| | c41 = 0.000e+000 | c43 = 0.000e+000 | c45 = 0.000e+000 | | |
| surface no. = 10 | | | | | |
| XYP | rdy = 4.055e+002 | c4 = 0.000e+000 | c6 = 0.000e+000 | c8 = −3.933e−003 | c10 = −5.339e−004 |
| | c11 = −3.999e−004 | c13 = 0.000e+000 | c17 = −8.346e−005 | c19 = 0.000e+000 | c21 = −9.730e−007 |
| | c22 = 1.619e−005 | c24 = −1.473e−005 | c26 = 7.804e−007 | c28 = −3.584e−008 | c30 = 1.096e−005 |
| | c32 = −3.213e−007 | c34 = −1.303e−008 | c36 = 1.218e−010 | c37 = −8.404e−013 | c39 = 1.246e−006 |
| | c41 = −3.014e−008 | c43 = −3.036e−009 | c45 = 8.701e−011 | | |
| surface no. = 11 | | | | | |
| XYP | rdy = 8.892e+000 | c4 = 0.000e+000 | c6 = 0.000e+000 | c8 = −6.976e−002 | c10 = −4.440e−003 |
| | c11 = −3.017e−004 | c13 = 0.000e+000 | c17 = 1.562e−005 | c19 = 0.000e+000 | c21 = −7.106e−004 |
| | c22 = −3.610e−005 | c24 = −5.060e−004 | c26 = 1.944e−004 | c28 = −6.797e−004 | c30 = 6.457e−006 |
| | c32 = −4.308e−006 | c34 = 1.238e−004 | c36 = −2.643e−004 | c37 = 1.156e−006 | c39 = 6.291e−005 |
| | c41 = −5.030e−006 | c43 = 2.002e−005 | c45 = −3.569e−005 | | |
| surface no. = 13 | | | | | |
| SPH | rdy = −6.834e+000 | | | | |
| surface no. = 14 | | | | | |
| SPH | rdy = 2.573e+000 | | | | |
| surface no. = 15 | | | | | |
| SPH | rdy = 4.969e+000 | | | | |

Figure 8A:
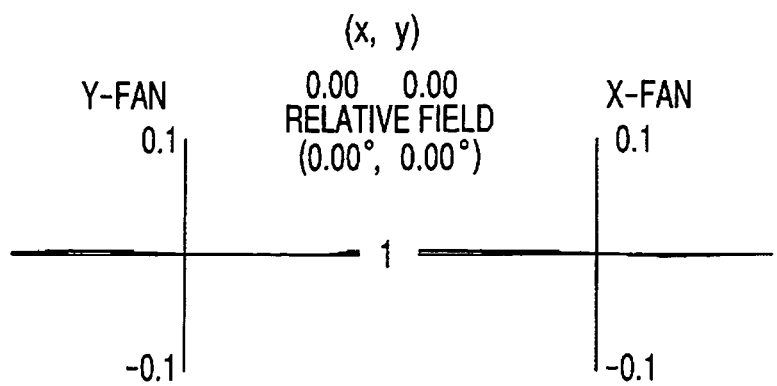
FIGS. 8A, 8B, 8C and 8D are lateral aberration graphs on surfaces undergoing scanning in an ocular optical system in Embodiment 3.
Figure 8B:
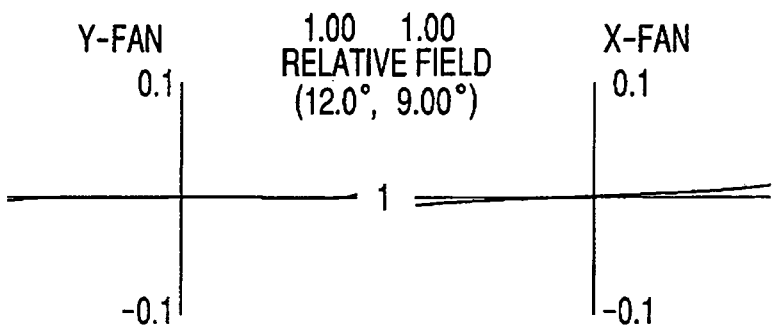
Figure 8C:
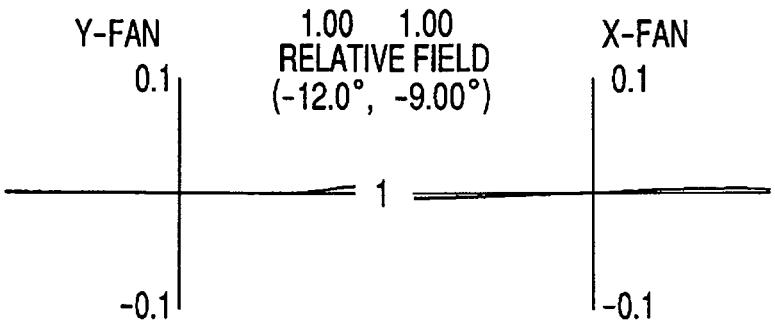
Figure 8D:
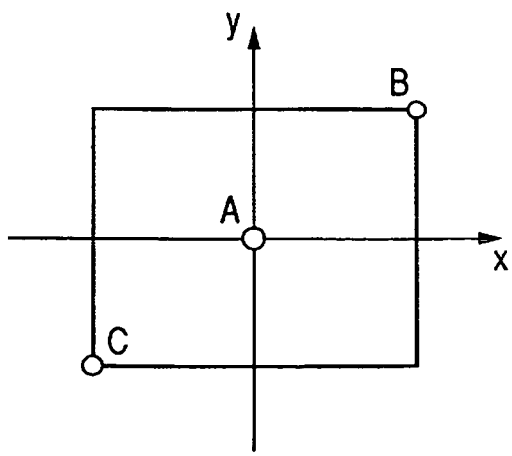

FIGS. 8A, 8B and 8C are lateral aberration graphs on scanning surfaces 506 (surface number 9) in an ocular optical system in the present embodiment. FIGS. 8A to 8C are lateral aberration graphs in respective positions of the screen center A, the right upper end B and the left bottom C in FIG. 8D when an observer places his/her eyes in the vicinity of the pupil 507 (surface number 1) of FIG. 5 respectively. The wavelength in the present aberration graphs is 587.56 nm.

According to the image display apparatus of each embodiment having been described above, effects as follows will be derived.

(1) By modulating a light source, compact configuration is enabled without using any external modulator etc.

In addition, enabling scanning in two-dimensional direction with one element as a scanning member, a configuration of the scanning member becomes simple to make the whole system compact.

In addition, using a prism member in an optical system, folding up an optical path and multiplying length of the optical path long equivalent by a number of times of proportion to the refractive index n of material configuring a prism member, miniaturization of the optical system is made easy.

Moreover, turning-back the optical path on an intermediate image forming surface (scanned surface) and reducing the number of the optical surfaces by using at least one surface in common in the scanning optical system and the ocular optical system, the optical system is miniaturized further.

(2) A prism member has at least one reflective surface on the optical path from the scanning member to the scanned surface and the reflective surface closest to the scanned surface on the optical path from the scanning member to the scanned surface and the surface closest to the exit pupil among the surfaces configuring the prism member are configured by surfaces different from each other, and thereby freedom of the optical system is increased and aberration is corrected better.

Here, a different surface refers to a case where at least one or more coefficients between equations expressing the two surfaces are different from each other in case of expressing respective surfaces with equations such as a polynomial etc.

(3) Assigning diffusion action to the turn-back reflecting surface, the light beam is broadened in the exit pupil position without decreasing resolution in the optical system.

(4) Providing three or more reflections inside the prism member, the optical path in an optical system can be folded more so as to simplify miniaturization of the whole optical system.

(5) Disposing two or more reflective surfaces on the optical path from the scanned surface to an observer, the optical path from the scanned surface to the observer is folded and thus the optical system is miniaturized so that the position of the exit pupil is guided to such a location that makes it easier for the observer to implement observation.

(6) The light source is moved in collaboration with the turn-back reflecting surface to implement the diopter adjustment so that the diopter adjustment is implemented without requiring any additional optical member, and thereby the configuration of the optical system can be simplified.

(7) Using scanning means derived by Micro Electro Mechanical SYSTEM (MEMS) produced by semiconductor processing, the size of the scanning means is made small so as to simplify miniaturization of the whole apparatus.

This application claims priority from Japanese Patent Application No. 2004-379937 filed on Dec. 28, 2004, which is hereby incorporated by reference herein.

What is claimed is:

1. An image display apparatus comprising:
a light source;
a scanning member for deflecting a light from said light source to scan a predetermined surface with the light to form a two-dimensional image thereon;
a first optical system for guiding the light deflected by the scanning member onto the predetermined surface, the first optical system having, on an optical path, an optical element with a plurality of optical surfaces including a refractive surface and a reflective surface formed on a same medium, the light deflected by the scanning member is guided to the predetermined surface through the reflective surface of the optical element; and
a second optical system for guiding the light from the two-dimensional image formed on the predetermined surface to an observer, the second optical system having the optical element on the optical path,
wherein the first optical system and second optical system share a part of optical surfaces of said optical element,
wherein the optical element has an entrance surface where a light deflected by the scanning member enters;
an exit surface from which the light from the two-dimensional image formed on the predetermined surface is emitted to said observer;
a plurality of reflective surfaces disposed on an optical path between the entrance surface and the exit surface,
wherein a reflective surface closest to the predetermined surface on the optical path from the scanning member to the predetermined surface is a surface different from the exit surface, and
wherein the reflective surface closest to the predetermined surface and the exit surface are configured by rotationally asymmetric surfaces.

2. An image display apparatus according to claim 1, wherein said optical member has at least two reflective surfaces on the optical path from said predetermined surface to said observer.

3. An image display apparatus according to claim 1, further comprising:
a turn-back reflecting surface for turning back the optical path, wherein said turn-back reflecting surface is located in said predetermined surface or in its vicinity.

4. An image display apparatus according to claim 3, wherein said turn-back reflecting surface has diffusion action.

5. An image display apparatus according to claim 3, wherein said optical element has a transmission surface for emitting the light from said scanning member toward said turn-back reflecting surface and the reflected light from said turn-back reflecting surface enters said optical element again from said transmission surface, and
said transmission surface is an optical surface shared by said first optical system and second optical system.

6. An image display apparatus according to claim 3, wherein said optical element has a first optical surface where a light from said scanning member enters, a second optical surface for reflecting the light from the first optical surface, a third optical surface for emitting the light from the second optical surface toward said turn-back reflecting surface, a fourth optical surface for reflecting a light that enters from said third optical surface to said optical element again after being reflected on said turn-back reflecting surface, a fifth optical surface for reflecting the light from the fourth optical surface and a sixth optical surface for emitting the light from the fifth optical surface toward said observer, and said third optical surface is an optical surface shared by said first optical system and second optical system.

7. An image display apparatus according to claim 6, wherein said fourth optical surface and sixth optical surface are the same surface.

8. An image display apparatus according to claim 1, further comprising a mechanism for displacing said light source in conjunction with said scanned surface, wherein said mechanism adjusts diopter.

* * * * *